(12) United States Patent
Hao et al.

(10) Patent No.: US 12,513,177 B2
(45) Date of Patent: Dec. 30, 2025

(54) METHOD AND APPARATUS FOR DETECTING TRAFFIC ANOMALY, DEVICE AND MEDIUM

(71) Applicant: Dbappsecurity Co., Ltd, Zhejiang (CN)

(72) Inventors: Weijie Hao, Hangzhou (CN); Bo Liu, Hangzhou (CN); Wenhai Wang, Hangzhou (CN); Peng Ye, Hangzhou (CN)

(73) Assignee: Dbappsecurity Co., Ltd, Hangzhou Zhejiang (CN)

( * ) Notice: Subject to any disclaimer, the term of this patent is extended or adjusted under 35 U.S.C. 154(b) by 68 days.

(21) Appl. No.: 18/607,446

(22) Filed: Mar. 16, 2024

(65) Prior Publication Data

US 2024/0314155 A1     Sep. 19, 2024

(30) Foreign Application Priority Data

Mar. 16, 2023   (CN) .......................... 202310274926.9

(51) Int. Cl.
H04L 9/40             (2022.01)

(52) U.S. Cl.
CPC ...... *H04L 63/1425* (2013.01); *H04L 63/1416* (2013.01)

(58) Field of Classification Search
None
See application file for complete search history.

(56) References Cited

U.S. PATENT DOCUMENTS

2007/0008884 A1 *  1/2007  Tang ..................... H04L 47/283
                                                                  370/230

FOREIGN PATENT DOCUMENTS

| CN | 109962891 A | * | 7/2019 | ......... H04L 63/1425 |
|---|---|---|---|---|
| CN | 109977680 A |   | 7/2019 | |
| CN | 110768832 A |   | 2/2020 | |
| CN | 111245848 A |   | 6/2020 | |
| CN | 112968816 A |   | 6/2021 | |
| CN | 115567258 A | * | 1/2023 | ............. H04L 63/20 |
| EP | 3432628 A1 |   | 1/2019 | |

OTHER PUBLICATIONS

The first office action of counterpart CN application No. 2023102749269 issued on Jun. 27, 2025.

* cited by examiner

*Primary Examiner* — Nelson S. Giddins
(74) *Attorney, Agent, or Firm* — The Sun IP Law

(57) ABSTRACT

Disclosed are a method and apparatus for detecting traffic anomaly, a device and a medium. The method includes: performing a network topology division operation on a network topology architecture to be detected, so as to obtain a plurality of security domains; acquiring a regional full traffic in each of the plurality of security domains, determining a traffic characteristic time series on the basis of regional full traffics, and analyzing the traffic characteristic time series to obtain a new traffic characteristic time series; constructing a traffic anomaly detection model, and performing distributed anomaly detection on the traffic characteristic time series by the traffic anomaly detection model, so as to obtain a detection result; and sending the detection result to an information processing center, so that the information processing center obtains anomalous asset devices and anomalous information according to the detection result.

18 Claims, 8 Drawing Sheets

METHOD AND APPARATUS FOR DETECTING TRAFFIC ANOMALY, DEVICE AND MEDIUM

TECHNICAL FIELD

The present disclosure relates to the field of computer technologies, and in particular, to a method and apparatus for detecting traffic anomaly, a device and a medium.

BACKGROUND

Critical infrastructures, such as energy, refining and chemical, and traffic, are nerve centers for stable operation of a country, and are the priority among priorities of network security in China. With the promotion of automation, interconnection and intelligent construction of national large-scale infrastructure equipment (intelligent substation, intelligent chemical process industrial system and industrial distributed control system), the problem of network space security thereof is increasingly prominent. In recent years, a series of network attacks aiming at national critical infrastructures cause a great national economic loss and irreversible damage to the society. These top hackers frequently intrude into a communication network of a load-center substation, a process industrial system or even a nuclear power station by means of an intrusion manner which is more concealed, more efficient and more powerful.

In the related art, traffic analysis methods based on statistics, deep packet parsing, rules, supervised learning, and unsupervised learning modes are widely used in industrial network traffic analysis technologies. Network anomaly events during the operation of an industrial control system are extracted by means of a traffic analysis technology, and alarm processing is performed on detected threats, which can significantly improve the security of an industrial network; when the industrial network has a large scale, the system is complex, and the number of network nodes included therein is large, a traditional single-point traffic analysis solution cannot cope with security threats faced thereby. The existing traffic anomaly detection models for the industrial Internet mainly adopt a single-point detection manner, and therefore comprehensive and low-complexity real-time detection cannot be directly performed on a large-scale complex industrial Internet scene, and most of the detections are based on traditional traffic probes, which can only perform overall convergence analysis on the traffic of a mirror port, has poor real-time performance, and is difficult to meet the real-time performance requirements of the industrial Internet. In addition, the network structure of the large-scale industrial Internet is complex, different security zones have different functions, and it is difficult to characterize an attack path of an attacker in an intranet environment by a conventional manner, and it is also difficult to combine same with physical functions of the industrial system. In a model level, a conventional Internet traffic detection mode is difficult to focus on self-similarity, periodicity, dynamic characteristics, multi-scale characteristics and multi-parting characteristics of industrial network traffic, and it is difficult to establish a unified model for different security domains in a complex industrial Internet scenario.

SUMMARY

According to a first aspect, some embodiments of the present disclosure disclose a method for detecting traffic anomaly, including:

a network topology division operation is performed on a network topology architecture to be detected, so as to obtain a plurality of security domains, and at least one asset device in each of the plurality of security domains is determined;

a regional full traffic in each of the plurality of security domains is acquired, a traffic characteristic time series is determined on the basis of regional full traffics, and the traffic characteristic time series is analyzed to obtain a new traffic characteristic time series;

a traffic anomaly detection model is constructed on the basis of the new traffic characteristic time series, and distributed anomaly detection is performed on the traffic characteristic time series by the traffic anomaly detection model, so as to obtain a detection result; and the detection result is sent to an information processing center which is preset, so that the information processing center analyzes all asset devices according to the detection result, so as to obtain anomalous asset devices and anomalous information.

In some embodiments, the regional full traffic in each of the plurality of security domains is acquired, includes:

a traffic probe system is respectively added to each of the plurality of security domains, and a connection relationship between a local switch mirror port and each of traffic probe systems is established; and the regional full traffic in each of the plurality of security domains is respectively acquired by the connection relationship.

In some embodiments, the traffic characteristic time series is determined on the basis of the regional full traffics, and the traffic characteristic time series is analyzed to obtain the new traffic characteristic time series, includes:

all the regional full traffics are acquired, and the traffic characteristic time series is determined on the basis the regional full traffics; and the traffic characteristic time series is analyzed by a sliding window algorithm, so as to obtain the new traffic characteristic time series.

In some embodiments, the distributed anomaly detection is performed on the traffic characteristic time series by the traffic anomaly detection model, so as to obtain the detection result, includes:

a deviation amount characterization operation is performed on the traffic characteristic time series by the traffic anomaly detection model, so as to obtain the detection result containing a deviation situation.

In some embodiments, the detection result is sent to the information processing center which is preset, so that the information processing center analyzes all the asset devices according to the detection result, so as to obtain the anomalous asset devices and the anomalous information, includes:

a connection relationship between local and the information processing center which is preset is established; and the detection result is sent to the information processing center by the connection relationship, so that the information processing center analyzes all the asset devices according to the deviation situation in the detection result, so as to obtain the anomalous asset devices and the anomalous information.

In some embodiments, the detection result is sent to the information processing center which is preset, so that the information processing center analyzes all the asset devices according to the deviation situation in the detection result, so as to obtain the anomalous asset devices and the anomalous information, includes:

the detection result is sent to the information processing center which is preset, so that the information processing center screens out the anomalous asset devices from all the asset devices according to the deviation situation, determines risk degrees of the anomalous asset devices, and determines at least one highest-risk asset device and at least one secondary-highest-risk asset device from the anomalous asset devices according to the risk degrees; and generates the anomalous information on the basis of the at least one highest-risk asset device, the at least one secondary-highest-risk asset device and the deviation situation.

In some embodiments, after the anomalous asset devices and the anomalous information are obtained, the method further includes:

intrusion path analysis is performed by an attack link characterization algorithm and on the basis of the anomalous asset devices and the anomalous information, so as to obtain a network attack link; and the detection result is detected by a traffic distributed detection algorithm to obtain an anomaly detection result, corresponding security domains are determined according to the anomaly detection result and the network attack link, and safety pre-warning and response are performed on the corresponding security domains.

According to a second aspect, some embodiments of the present disclosure disclose an apparatus for detecting traffic anomaly, including:

a network topology division component, configured to perform a network topology division operation on a network topology architecture to be detected, so as to obtain a plurality of security domains, and determine at least one asset device in each of the plurality of security domains;

a time series determination component, configured to acquire a regional full traffic in each of the plurality of security domains, determine a traffic characteristic time series on the basis of regional full traffics, and analyze the traffic characteristic time series to obtain a new traffic characteristic time series;

a distributed anomaly detection component, configured to construct a traffic anomaly detection model on the basis of the new traffic characteristic time series, and perform distributed anomaly detection on the traffic characteristic time series by the traffic anomaly detection model, so as to obtain a detection result; and a detection result sending component, configured to send the detection result to an information processing center which is preset, so that the information processing center analyzes all asset devices according to the detection result, so as to obtain anomalous asset devices and anomalous information.

According to a third aspect, some embodiments of the present disclosure disclose an electronic device, including:

a memory for storing a computer program;

and a processor, for executing the computer program, to implement the described method for detecting traffic anomaly.

According to a fourth aspect, some embodiments of the present disclosure disclose a computer storage medium for storing a computer program; and when executed by a processor, the computer program implements the steps of the method for detecting traffic anomaly disclosed above.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art are introduced briefly. Apparently, the accompanying drawings in the following description merely relate to embodiments of the present disclosure, and for a person of ordinary skill in the art, other accompanying drawings may also be obtained according to the provided accompanying drawings without involving any inventive effort.

DETAILED DESCRIPTION OF THE EMBODIMENTS

Figure 1:
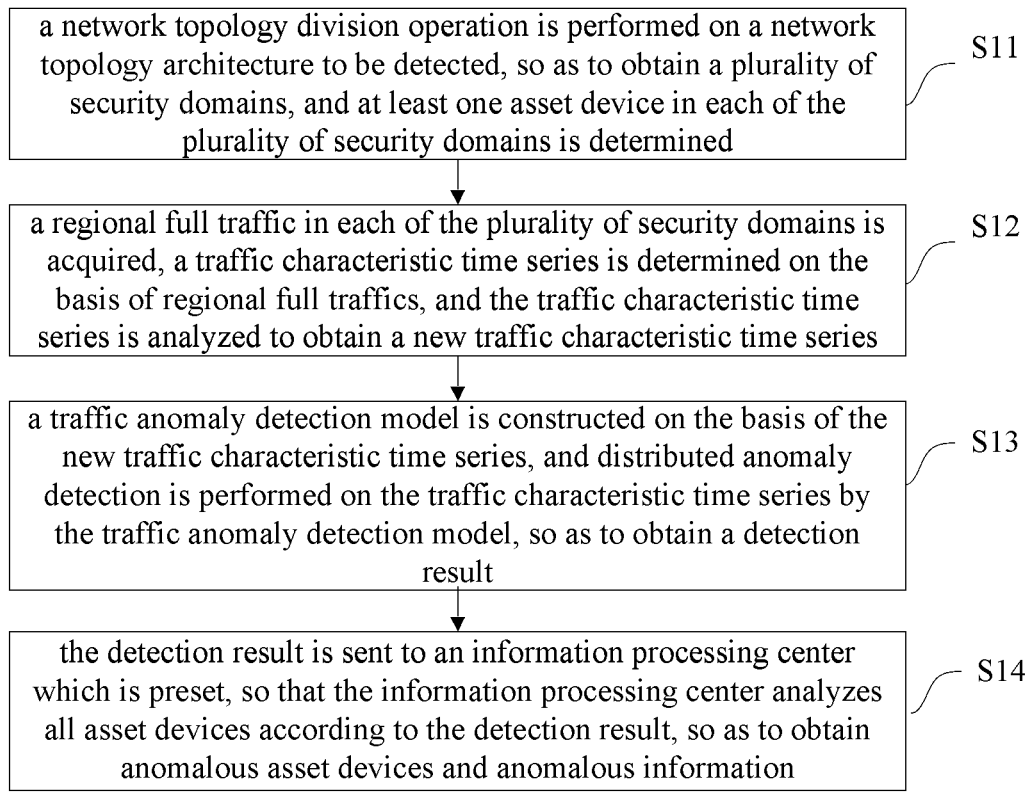
FIG. 1 is a flowchart of a method for detecting traffic anomaly disclosed in some embodiments of the present disclosure.

Hereinafter, the technical solutions in the embodiments of the present disclosure will be described clearly and completely with reference to the accompanying drawings of the embodiments of the present disclosure. Obviously, the embodiments as described are only some of the embodiments of the present disclosure, and are not all of the embodiments. All the other embodiments obtained by a person of ordinary skill in the art on the basis of the embodiments in the present disclosure without involving any inventive effort shall all fall within the scope of protection of some embodiments of the present disclosure.

Critical infrastructures, such as energy, refining and chemical, and traffic, are nerve centers for stable operation of a country, and are the priority among priorities of network security in China. With the promotion of automation, interconnection and intelligent construction of national large-scale infrastructure equipment (intelligent substation, intelligent chemical process industrial system and industrial distributed control system), the problem of network space security thereof is increasingly prominent. In recent years, a series of network attacks aiming at national critical infrastructures cause a great national economic loss and irreversible damage to the society. These top hackers frequently intrude into a communication network of a load-center substation, a process industrial system or even a nuclear power station by means of an intrusion manner which is more concealed, more efficient and more powerful. According to relevant reports and documents, all attacks against industrial systems are reflected on communication networks, most attacks against industrial networks will cause damage to related communication networks, and different types of attacks lead to different damage degrees and positions of the networks. Combo attacks led by "Blackenergy" and injection of a series of malicious codes may cause communication network paralysis, a critical channel is blocked, and a data acquisition and supervisory (SCADA) system is manipulated, to control situations such as delayed recovery and state blindness of the system. At present, traffic analysis methods based on statistics, deep packet parsing, rules, supervised learning, and unsupervised learning modes are widely used in industrial network traffic analysis technologies. Network anomaly events during the operation of an industrial control system are extracted by means of a traffic analysis technology, and alarm processing is performed on detected threats, which may significantly improve the security of an industrial network; when the industrial network has a large scale, the system is complex, and the number of network nodes included therein is large, a traditional single-point traffic analysis solution may not cope with security threats faced thereby. The existing traffic anomaly detection models for the industrial Internet mainly adopt a single-point detection manner, and therefore comprehensive and low-complexity real-time detection may not be directly performed on a large-scale complex industrial Internet scene, and most of the detections are based on traditional traffic probes, which may only perform overall convergence analysis on the traffic of a mirror port, has poor real-time performance, and is difficult to meet the real-time performance requirements of the industrial Internet. In addition, the network structure of the large-scale industrial Internet is complex, different security zones have different functions, and it is difficult to characterize an attack path of an attacker in an intranet environment by a conventional manner, and it is also difficult to combine same with physical functions of the industrial system. In a model level, a conventional Internet traffic detection mode is difficult to focus on self-similarity, periodicity, dynamic characteristics, multi-scale characteristics and multi-parting characteristics of industrial network traffic, and it is difficult to establish a unified model for different security domains in a complex industrial Internet scenario. Hence, how to implement anomaly detection of a plurality of security zones in industrial Internet with a large scale and complex system, how to increase the efficiency of traffic anomaly detection and how to reduce the complexity of traffic anomaly detection are problems to be solved in the art.

In view of this, an object of some embodiments of the present disclosure is to provide a method and apparatus for detecting traffic anomaly, a device and a medium, which may implement anomaly detection of a plurality of security zones in industrial Internet with a large scale and complex system, so as to increase the efficiency of traffic anomaly detection and reduce the complexity of traffic anomaly detection.

Refer to FIG. 1, some embodiments of the present disclosure disclose a method for detecting traffic anomaly, which may specifically include:

step S11: a network topology division operation is performed on a network topology architecture to be detected, so as to obtain a plurality of security domains, and at least one asset device in each of the plurality of security domains is determined.

Figure 2:
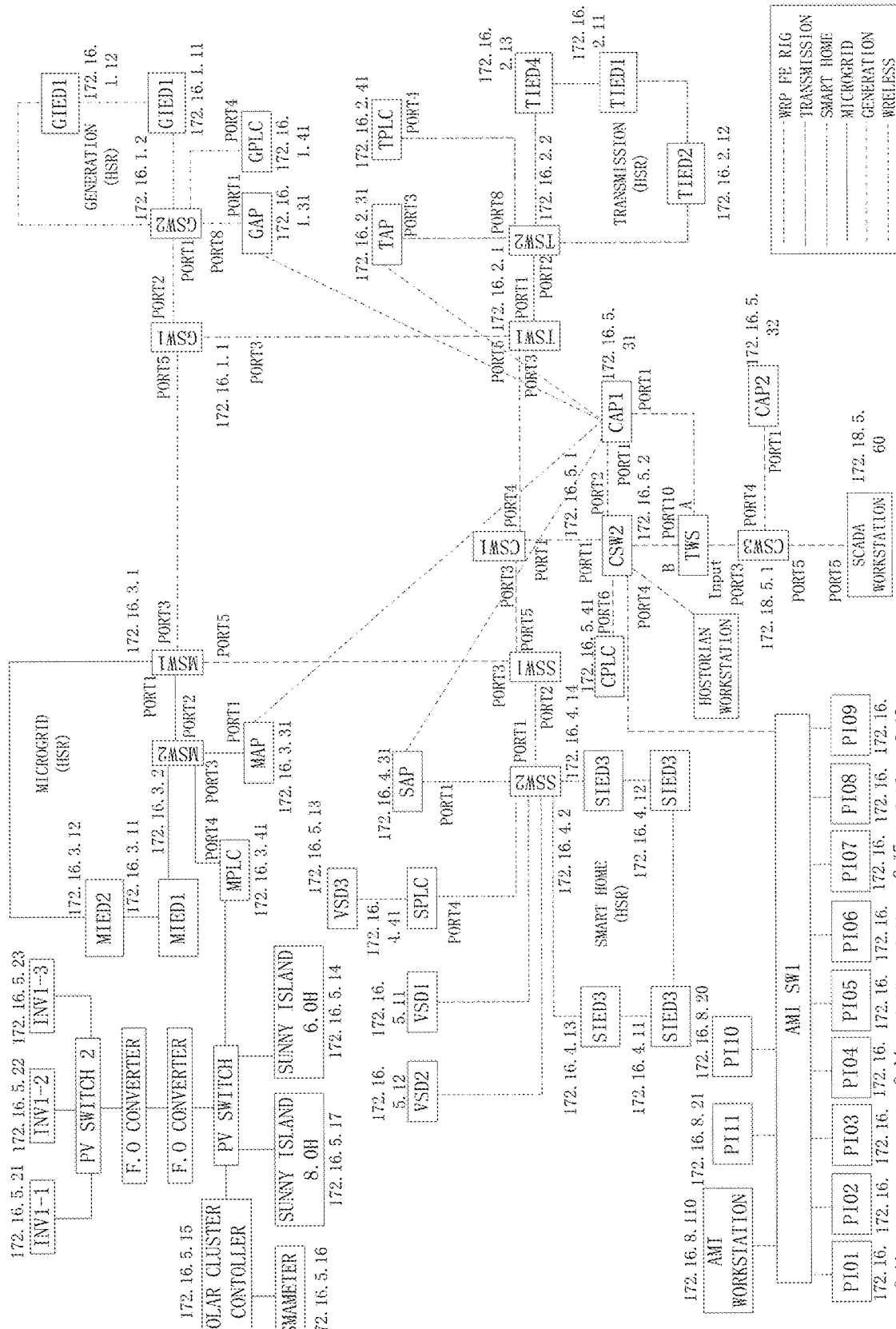
FIG. 2 is a network topology architecture diagram disclosed in some embodiments of the present disclosure.

In the present embodiment, first the network topology architecture to be detected, as shown in FIG. 2, is acquired, and then, physical functions of an industrial Internet are used to perform the network topology division operation on the network topology architecture to be detected, so as to obtain the plurality of security domains, and the at least one asset device in each of the plurality of security domains is determined. In FIG. 2, AP represents access point, IED represents intelligent electrical device, SW represents network switches, CSW3 represents firewall, PLC represent programmable logic control, PSU represents power supply unit, PI represents raspberry PI 3, VSD represents variable speed drive, and INV represents SMA grid-tied inverter.

The concept of network zone division was first proposed in IEC 62443, which is aimed at grouping physical information assets according to predefined security standards and requirements. According to the predefined standards, the security domains of the industrial network may be split according to various actual network topologies (i.e. communication systems in different industrial processes). The division of the security domains is a model-driven method, and is used for describing and quantifying the most valuable industrial network assets. Zone division is performed on a large-scale industrial network, and the large-scale industrial network may be divided into a Central Distributed Detection Zone (CDDZ for short) and a plurality of Distributed Detection Zones (DDZ for short), thereby implementing distributed detection of the network. A control center of the industrial network is located at the CDDZ, and the DDZs cover a series of physical information devices (such as field devices and controllers), and are connected to local Ethernet switches to complete corresponding control actions (such as circuit breaker control and electric generator control). Each DDZ or CDDZ in the industrial network may independently perform anomaly detection on network attacks by an edge computing device. Compared with traditional Internet traffic, network traffic of each security domain is smaller, and using a distributed traffic analysis method may significantly reduce computation overheads in an actual working condition. As complex data is split, training of the model is easier. A k-th DDZ (i.e. DDZ #k) is defined as $\Lambda^{(k)}=\{\Lambda_i^{(k)}|i=1$ to $n^{(k)}\}$ $\Lambda^{(k)}=\{\Lambda_i^{(k)}|i=1$ to $n^{(k)}\}$; and $k\neq 0$ and $\Lambda_i^{(k)}$ represents in the k-th DDZ, i represents an i-th specific industrial network asset device, and $n^{(k)}$ is the total number of devices contained in the k-th DDZ. For example, $\Lambda_2^{(1)}$ represents a second device in a first DDZ. A CDDZ (i.e. DDZ #0) is defined as $\Lambda^{(0)}=\{\Lambda_i^{(k)}|i=1$ to $n^{(0)}\}$.

Figure 3:
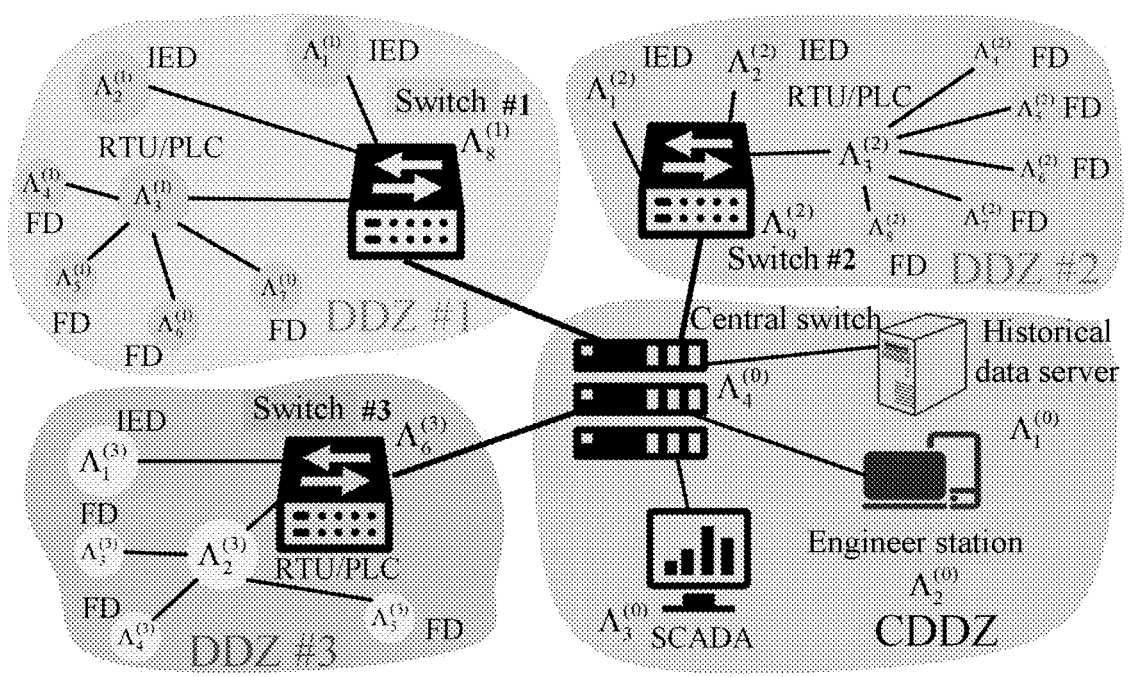
FIG. 3 is a schematic diagram of division of security domains disclosed in some embodiments of the present disclosure.

A schematic diagram the division of the plurality of security domains is as shown in FIG. 3, in FIG. 3 a remote terminal unit (RTU), a programmable logic controller (PLC) and an intelligent electronic device (IED) are directly connected to a local switch. Field Devices (FD for short) are usually directly connected to the RTU or PLC. A central switch is connected to a historical data server, an engineer station and a supervisory control and data acquisition (SCADA) system.

Step S12: a regional full traffic in each of the plurality of security domains is acquired, a traffic characteristic time series is determined on the basis of regional full traffics, and the traffic characteristic time series is analyzed to obtain a new traffic characteristic time series.

In the present embodiment, a traffic probe system is respectively added to each of the plurality of security domains, and a connection relationship between a local switch mirror port and each of traffic probe systems is established; and the regional full traffic in each of the plurality of security domains is acquired by the connection relationship, then all the regional full traffics are acquired, and the traffic characteristic time series is determined on the basis of the regional full traffics, and the traffic characteristic time series is analyzed by a sliding window algorithm, so as to obtain the new traffic characteristic time series.

In the present embodiment, real-time input of distributed network detection may be a continuous time series representing dynamic status of the network, such as the number of sent/received packets per second, a packet arrival time interval, a data transmission rate (DTR), etc. This detection method is a data-driven solution, and uses multi-dimensional dynamic input data to model a network traffic mode, and further recognizes anomaly. For example, DTR is used as dynamic input, and in actual operations, DTR may be acquired and analyzed dynamically in each of the plurality of security domains respectively. This process uses a probe mechanism, thereby not introducing additional redundant traffic, which affects the supervision effect. The distributed network traffic detection method may identify a dynamic upper-limit threshold value of each security domain (including DDZs and a CDDZ), and find the anomalous network traffic mode in time. A k-th traffic distributed collection point is defined, and a collected traffic characteristic time series thereof is:

$$X_t^{(k)} = \{x_1^{(k)}, x_2^{(k)}, \ldots, x_t^{(k)}\}, k = 0, 1, 2, \ldots, k_{all};$$

where element $x_t^{(k)}$ of $X_t^{(k)}$ is the DTR value of the k-th DDZ at time t. A time series $X_t^{(k)}$, k=0, 1, 2, ..., $k_{all}$ may be collected simultaneously and separately at different security domains. Segmental analysis is performed on the collected time series by a Sliding Time Window (STW for short) algorithm, and the detection granularity thereof is enlarged. The solution may effectively realize an online modeling process and classification of dynamic outliers. An STW having a length of $t_s$ is used to define a time series of i-th iteration (i.e. the new traffic characteristic time series) is defined as:

$$x_{t_s,i}^{(k)} = \{x_{1,i}^{(k)}, \ldots, x_{t_s,i}^{(k)}\} = \{x_{(i-1)t_s+1}^{(k)}, x_{(i-1)t_s+2}^{(k)}, \ldots, x_{i \cdot t_s}^{(k)}\}, k = 1, \ldots, k_{all}.$$

Step S13: a traffic anomaly detection model is constructed on the basis of the new traffic characteristic time series, and distributed anomaly detection is performed on the traffic characteristic time series by the traffic anomaly detection model, so as to obtain a detection result.

In the present embodiment, after the traffic anomaly detection model is constructed on the basis of the new traffic characteristic time series, a deviation amount characterization operation is performed on the traffic characteristic time series by the traffic anomaly detection model, so as to obtain a detection result containing a deviation situation.

In the present embodiment, a training set based on an ARIMA threshold value model is defined as $X_{t_s,i}^{(k)}$, and then the ARIMA model (i.e. the traffic anomaly detection model) may be expressed as follows:

$$\hat{X}_{N_{fore},i}^{(k)} = f_{ARIMA}(X_{t_s,i}^{(k)}, AIC', N_{fore});$$

where an ARIMA(p, d, q) model may be considered as a $f_{ARIMA}(\ )$ function. The model adopts an AIC order determination manner to acquire optimal p, q parameters of the ARIMA model. A difference coefficient d may be obtained by an ADF test. The length of an ARIMA forecast sequence is $N_{fore}$. $\hat{X}_{N_{fore},i}^{(k)}$ is an ARIMA model forecast sequence of the k-th DDZ at the i-th iteration.

Step S14: the detection result is sent to an information processing center which is preset, so that the information processing center analyzes all asset devices according to the detection result, so as to obtain anomalous asset devices and anomalous information.

In the present embodiment, a connection relationship between local and the information processing center which is preset is established; and then the detection result is sent to the information processing center by the connection relationship, so that the information processing center analyzes all the asset devices according to a deviation situation in the detection result, so as to obtain anomalous asset devices and anomalous information.

Figure 4:
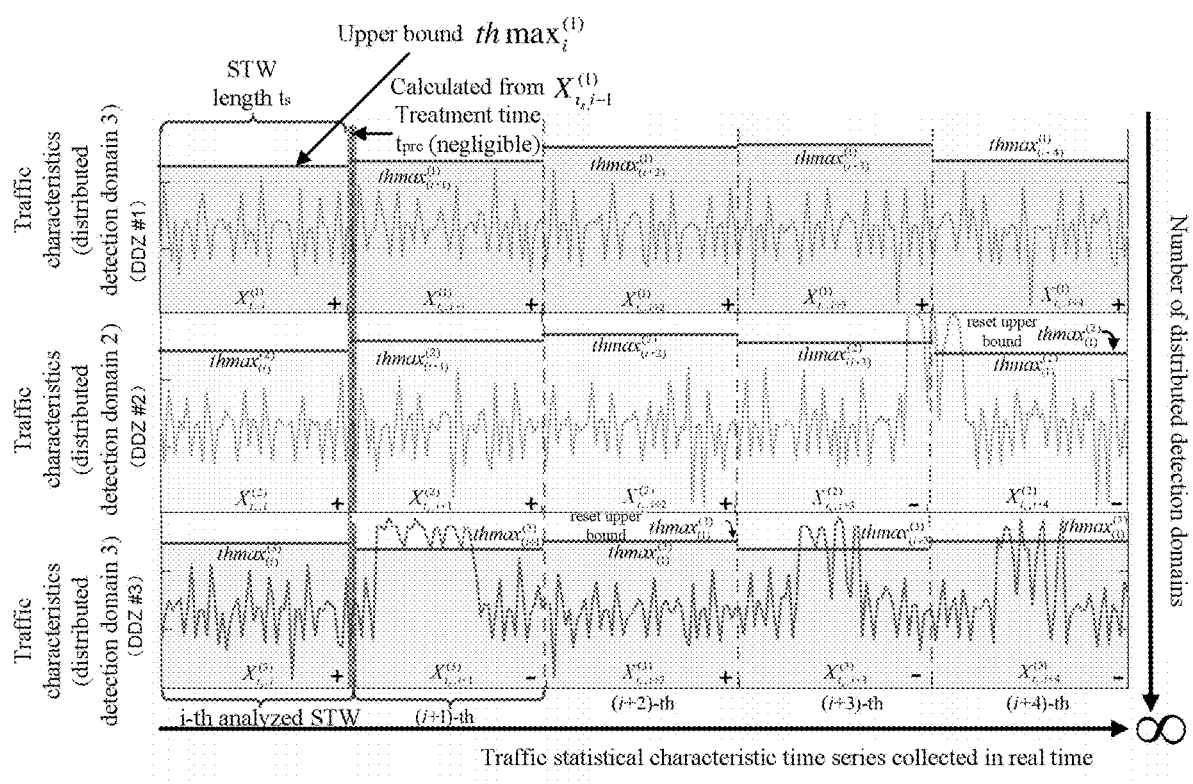
FIG. 4 is a schematic diagram of a traffic analysis principle disclosed in some embodiments of the present disclosure.

In the present embodiment, an operation time of the ARIMA model may be ignored, and therefore a time point corresponding to the last piece of data of an i-th STW approximately coincides with a time point corresponding to first piece of data of an (i+1)-th STW, which ensures strict real-time detection requirements of the industrial network. Confidence is selected as $\alpha_{P,I}$, and an upper limit of a distributed traffic threshold value of the k-th DDZ at the i-th iteration is:

$$th \max_{i+1}^{(k)} = \frac{1}{N_{fore}} \sum_{m=1}^{N_{fore}} \hat{x}_{m,i}^{(k)} + z_{(1-\alpha_{P,I})} \sqrt{\frac{1}{N_{fore}} \cdot \sum_{m=1}^{N_{fore}} \left[\hat{x}_{m,i}^{(k)} - \frac{1}{t_s} \sum_{n=1}^{t_s} x_{n,i}^{(k)}\right]^2};$$

where an (i+1)-th upper bound is a z-score when $z_{(1-\alpha_{P,I})}$ has statistical significance of $1-\alpha_{P,I}$, which is calculated by data traffic samples of the i-th iteration. For example, when $1-\alpha_{P,I}=1.96$, the confidence $\alpha_{P,I}=0.95$ (95% confidence). A schematic diagram of a distributed traffic detection algorithm is as shown in FIG. 4.

In the present embodiment, a network topology division operation is performed on a network topology architecture to be detected, so as to obtain the plurality of security domains, and the at least one asset device in each of the plurality of security domains is determined; the regional full traffic in each of the plurality of security domains is acquired, the traffic characteristic time series is determined on the basis of the regional full traffics, and the traffic characteristic time series is analyzed to obtain the new traffic characteristic time series; the traffic anomaly detection model is constructed on the basis of the new traffic characteristic time series, and the distributed anomaly detection is performed on the traffic characteristic time series by the traffic anomaly detection model, so as to obtain the detection result; and the detection result is sent to the information processing center which is preset, so that the information processing center analyzes all the asset devices according to the detection result, so as to obtain the anomalous asset devices and the anomalous information. In some embodiments of the present disclosure, an autoregressive integrated moving average (ARIMA) model-based traffic distributed anomaly detection model may perform anomaly detection of a plurality of security zones in industrial Internet with a large scale and complex system, and the large-scale network is divided, thereby significantly reducing data transmission during communication and improving the data redundancy of network data transmission; a distributed network analysis method is used, may improve the security analysis and response capability of the large-scale industrial network, and has high expandability, traceability and detection efficiency. Moreover, some embodiments of the present disclosure are based on a traffic anomaly detection model (ARIMA) and may perform real-time detection on anomalies of the industrial network in a relatively high precision. The algorithm complexity of the ARIMA model is low, and the difficulty of model parameter adaptation is relatively low, and may be adapted to industrial network traffic changes in many scenarios.

Figure 5:
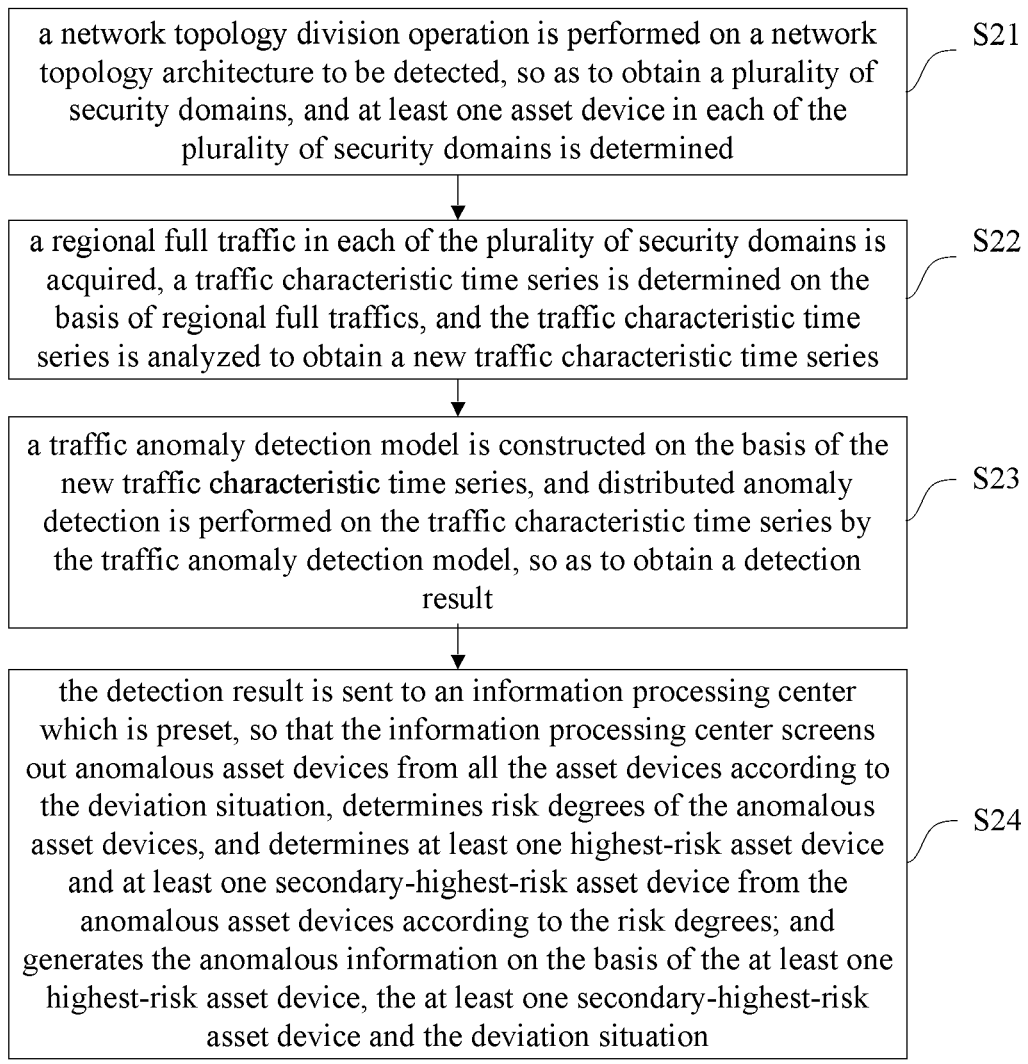
FIG. 5 is a flowchart of a method for detecting traffic anomaly disclosed in some embodiments of the present disclosure.

Refer to FIG. 5, embodiments of the present disclosure disclose a method for detecting traffic anomaly, which may specifically include:

step S21: a network topology division operation is performed on a network topology architecture to be detected, so as to obtain a plurality of security domains, and at least one asset device in each of the plurality of security domains is determined;

step S22: a regional full traffic in each of the plurality of security domains is acquired, a traffic characteristic time series is determined on the basis of regional full traffics, and the traffic characteristic time series is analyzed to obtain a new traffic characteristic time series;

step S23: a traffic anomaly detection model is constructed on the basis of the new traffic characteristic time series, and distributed anomaly detection is performed on the traffic characteristic time series by the traffic anomaly detection model, so as to obtain a detection result; and step S24: the detection result is sent to an information processing center which is preset, so that the information processing center screens out anomalous asset devices from all the asset devices according to the deviation situation, determines risk degrees of the anomalous asset devices, and determines at least one highest-risk asset device and at least one secondary-highest-risk asset device from the anomalous asset devices according to the risk degrees; and generates the anomalous information on the basis of the at least one highest-risk asset device, the at least one secondary-highest-risk asset device and the deviation situation.

In the present embodiment, for the k-th DDZ, when $X_{t_s,\tilde{i}}^{(k)}$ exceeds a threshold value upper limit (i.e. $\exists \{x_{j,\tilde{i}}^{(k)} | j=1$ to $t_s\} \notin [0, \text{th max}_{\tilde{i}+1}^{(k)}])$, an STW in which an anomaly condition occurs at this time is defined as an $\tilde{i}$-th STW. Deviation of the $\tilde{i}$-th STW may be calculated as follows:

$$d_{\tilde{i}}^{(k)} = \sum_{m=1}^{t_s} \left(x_{m,\tilde{i}}^{(k)} - \text{th max}_{m,\tilde{i}}^{(k)}\right) / \text{th max}_{m,\tilde{i}+1}^{(k)};$$

where a deviation set $D^{(k)} = \{d_1^{(k)}, d_2^{(k)}, d_3^{(k)}, \ldots\}$ reflects an anomaly deviation situation of each STW when an anomaly condition occurs. Deviation of network traffic characteristics (in this example, $D^{(k)}$ of DTR) caused by network attacks or network anomaly may directly affect industrial devices and cause damage to network devices. When $d \neq 0$, by calculating proportional change of data traffic of each device caused by network attack, a device fault location method may be further established. By analyzing the $\tilde{i}$-th STW of the k-th DDZ, high-risk devices $^1\tilde{\Lambda}$ and $^2\tilde{\Lambda}$ may be screened out (the risk degree of $^1\tilde{\Lambda}$ being higher than that of $^2\tilde{\Lambda}$):

$$\begin{cases} ^1\tilde{\Lambda} = \underset{\Lambda \in \Lambda^{(k)}}{\arg\max} \sum_{m=1}^{t_s} \left| \frac{x_{m,\tilde{i}}^{(k)}(\Lambda)}{x_{m,\tilde{i}}^{(k)}} - \frac{x_{m,\tilde{i}-1}^{(k)}(\Lambda)}{x_{m,\tilde{i}-1}^{(k)}} \right| / \sum_{m=1}^{t_s} \frac{x_{m,\tilde{i}-1}^{(k)}(\Lambda)}{x_{m,\tilde{i}-1}^{(k)}} \\ ^1\tilde{\Lambda} = \underset{\Lambda \in (\Lambda^{(k)} - \{^1\tilde{\Lambda}\})}{\arg\max} \sum_{m=1}^{t_s} \left| \frac{x_{m,\tilde{i}}^{(k)}(\Lambda)}{x_{m,\tilde{i}}^{(k)}} - \frac{x_{m,\tilde{i}-1}^{(k)}(\Lambda)}{x_{m,\tilde{i}-1}^{(k)}} \right| / \sum_{m=1}^{t_s} \frac{x_{m,\tilde{i}-1}^{(k)}(\Lambda)}{x_{m,\tilde{i}-1}^{(k)}} \end{cases};$$

where $k = 0, 1, 2, \ldots, k_{all}$ (indicates that the algorithm traverses all the plurality of security domains).

$$\sum_{m=1}^{t_s} x_{m,\tilde{i}}^{(k)}(\Lambda)$$

represents the total DTR at the $\tilde{i}$-th STW of a device $\Lambda$ at the k-th DDZ (the device is calculated as either a data source or a data destination). Algorithm 1 (Table 1) gives pseudo codes of a distributed network online detection algorithm.

TABLE 1

Algorithm 1: Distributed network online detection algorithm

Input: Real-time DTR sequence $X_t^{(k)}$, and a selected STW length $t_s$
Output: Distributed deviation set $D^{(k)}$
High-risk device sets $^1\tilde{\Lambda}^{(k)}$ and $^2\tilde{\Lambda}^{(k)}$
Standardized $D^{(k)} \leftarrow \emptyset$ (empty set), $\text{thmax}_1^{(k)} = 0$, $d_1^{(k)} = 0$
I ← 2
for each k ∈ {0, 1, 2, ..., $k_{all}$}
| $X_{t_s,i}^{(k)} \leftarrow$ GetSTWSeri($X_t^{(k)}$) /* use formula (2) to acquire an STW sequence */
| if $d_{i-1}^{(k)} > 1$ then /* if the deviation is large */
|   | $\text{thmax}_{i+1}^{(k)} \leftarrow \text{thmax}_i^{(k)}$ /* reset a threshold value upper limit */
| else /* if the deviation is not large */
|   | $\text{thmax}_{i+1}^{(k)} \leftarrow$ CalcuUpThre( $X_{t_s,i}^{(k)}$ )/* use formulas (3) and (4) to calculate threshold
|   | value upper limit */
| if $\exists x_{t_s,i}^{(k)} \notin [0, \text{thmax}_{i+1}^{(k)}]$ then
|   | $D^{(k)} \leftarrow$ CalcuDeviSet( $X_{t_s,i}^{(k)}$ , $\text{thmax}_{i+1}^{(k)}$ )/* use formula (5) to calculate the deviation
|   | set */
|   | $^1\tilde{\Lambda}^{(k)}$ , $^2\tilde{\Lambda}^{(k)} \leftarrow$ CalcuHiRiskSet( $X_{t_s,i}^{(k)}$ )/* use formula (6) to calculate the high-risk
|   | device sets */
| else
|   | $d_i^{(k)} \leftarrow 0$ /* current STW has no anomaly */
| i ← i+1 /* analyze a next STW */
Return $D^{(k)}$, $^1\tilde{\Lambda}^{(k)}$ and $^2\tilde{\Lambda}^{(k)}$ A highest-risk device set $^1\tilde{\Lambda}^{(k)}=\{^1\tilde{\Lambda}_1^{(k)}, ^1\tilde{\Lambda}_2^{(k)}, \ldots\}$, a secondary-highest-risk device set $^2\tilde{\Lambda}^{(k)}=\{^2\tilde{\Lambda}_1^{(k)}, ^2\tilde{\Lambda}_2^{(k)}, \ldots\}$, and a distributed deviation set $D^{(k)}$ are dynamically acquired, so as to further analyze the most affected industrial network device assets in an anomaly condition, and characterize an attack path.

Step S25: intrusion path analysis is performed by an attack link characterization algorithm and on the basis of the anomalous asset devices and the anomalous information, so as to obtain a network attack link; and then the detection result is detected by a traffic distributed detection algorithm to obtain an anomaly detection result, corresponding security domains are determined according to the anomaly detection result and the network attack link, and safety pre-warning and response are performed on the corresponding security domains.

Figure 6:
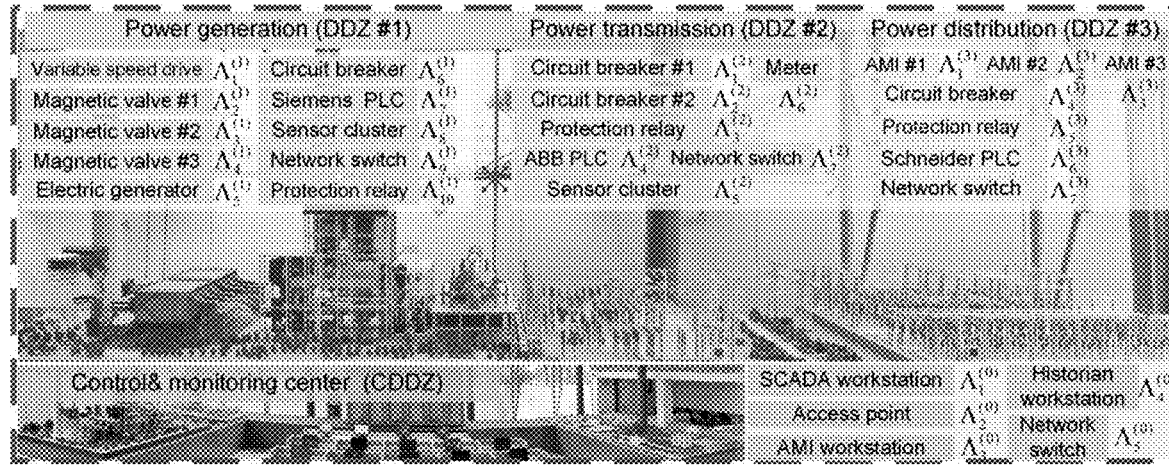
FIG. 6 is a schematic diagram of a power testing platform disclosed in some embodiments of the present disclosure.

By means of the distributed traffic anomaly detection algorithm, the anomaly deviation set $D^{(k)}$, the highest-risk device set $^1\tilde{\Lambda}^{(k)}$ and the secondary-highest-risk device set $^2\tilde{\Lambda}^{(k)}$ may be obtained. A time interval for the analysis is defined as $[0,t_{en}]$, where $t_{en}$ represents an analysis end time. All anomalous events occurring during the detection (i.e. time 0 to $t_{en}$) may be defined as elements in $_0^{t_{en}}\tilde{I}=\{\tilde{i}_1, \tilde{i}_1, \ldots\}_0^{en}$; where $\tilde{i}$ represents an $\tilde{i}$ th anomalous sliding time window (STW). A last STW iteration cycle $i_{en}$ may be calculated as $i_{en}=[t_{en}-t_{en} \bmod t_s]/t_s$, where Mod is a modulo operation. An attack path characterization algorithm is as shown in algorithm 2 (Table 2).

proposed distributed traffic detection algorithm. A power range test platform is composed of power generation, power transmission and distribution systems and a control center, as shown in FIG. 6. By division of security domains, a complex electric power industrial network is divided into three DDZs and one CDDZ. As an intelligent instrument device for monitoring field devices, an advanced measurement system (AMI) may feed back field parameters of various DDZs in time to an AMI workstation in the CDDZ, thereby facilitating the control center to monitor field conditions in real time. On the basis of a Modbus/TCP protocol, an operation command and a sampling signal are transmitted from the CDDZ to PLCs, and finally reach a field device to execute a corresponding physical operation instruction, so as to finally implement a designated function. The power generation, power transmission and power distribution systems respectively adopt PLCs of Siemens, ABB and Schneider, and respectively adopt independent switches as media for signal interaction, and therefore the power generation, power transmission and power distribution systems may be considered as different DDZs (as shown in FIG. 6). Attack injection platforms (Core i5, i5-6267u, MacBook pro) are connected to a central switch located in the CDDZ through an optical fiber, and use Python 3.6 to write attack scripts to perform malicious network attack experiments. Traffic monitoring scripts and a distributed network detection algorithm (both using Python 3.6) are used to perform on-line collection in each security domain, and analyze distributed network traffic. A traffic collection algorithm filters out

TABLE 2

Algorithm 2: Attack path characterization algorithm

Input: Anomaly deviation set $D^{(k)}$ and end time $t_{en}$,
critical threshold value $\varepsilon$, high-risk device set $^1\tilde{\Lambda}^{(k)}$ and secondary-high-risk device set $^2\tilde{\Lambda}^{(k)}$
Output: Attack path $A^\varepsilon$, integration deviation $D^\varepsilon$, total number of anomalous STWs $h/2$
and total number of anomalous devices $\tilde{n}(a)$ 1  Initialization $\tilde{i}=1$ and $h=1$
2  for each $i \in \{1,2,\ldots,i_{en} = [t_{en} - (t_{en} \bmod t_s)]/t_s\}$ /*, analyze a plurality of STWs at a defined time interval */
3  |     for each $k \in \{0, 1, 2, \ldots, k_{all}\}$ /* analyze all security domain conditions for each STW */
4  |     |    if $d_i^{(k)} > \varepsilon$ then /* if an anomaly deviation is greater than a set threshold value */
5  |     |    |    $^1a_{\tilde{i}}, ^2a_{\tilde{i}} \leftarrow$ GetHiRiskLabel( $^1\tilde{\Lambda}^{(k)}, ^2\tilde{\Lambda}^{(k)}$ ) /* obtain numbers of high-risk devices and secondary-high-risk devices */
6  |     |    |    $a_h^\varepsilon = (^1a_{\tilde{i}}, k)^T$, $a_{h+1}^\varepsilon = (^2a_{\tilde{i}}, k)^T$, $d_{i,k}^\varepsilon = d_i^{(k)}$ /* obtain minor-cycle numbers of anomalous STWs */
7  |     |    |    $h \leftarrow h+2$ /* calculate the total number of high-risk devices and secondary-high-risk devices */
8  |     |    else /* if the anomaly deviation is less than the set threshold value */
9  |     |    |    $d_{i,k}^\varepsilon \leftarrow 0$ /* set the anomaly deviation as zero */
10 $A_{2 \times h}^\varepsilon = (a_1^\varepsilon, a_2^\varepsilon, \ldots, a_h^\varepsilon)$ /* $A_{2 \times h}^\varepsilon = [\text{asset\_label located\_DDZ}]^T$, $a_h^\varepsilon = (a_{1,h}^\varepsilon, a_{2,h}^\varepsilon)^T$ */
11 $\tilde{n}(a) \leftarrow$ GetSameVectNumb( $A_{2 \times h}^\varepsilon$ ) /* search all vectors a from a set $A_{2 \times h}^\varepsilon$, to obtain the number of same vectors */
12 Return $A_{2 \times h}^\varepsilon = \{(a_{1,1}^\varepsilon\ a_{2,1}^\varepsilon)^T, \ldots, (a_{1,h}^\varepsilon\ a_{2,h}^\varepsilon)^T\}$, $D^\varepsilon$, $h/2$, $\tilde{n}(a)$ The dynamic attack path A may be obtained according to the real-time integration deviation $D^\varepsilon$ and higher-risk devices. The integration deviation $D^\varepsilon$ of network traffic may be obtained from a deviation matrix $D^{(k)}$; by adjusting the critical threshold value $\varepsilon$, the sensitivity of the detection may be adjusted. The proposed dynamic attack path of an intruder may effectively trace back network attacks across different security domains (i.e. DDZs and CDDZ), and further describes the most possible attack intention of the intruder.

In the present embodiment, by the probe mechanism, real-time network data traffic measurement data is collected from a power testing platform in a range environment without interrupting normal operation, so as to evaluate the irrelevant traffic in each security domain, and may filter internal traffic generated by interaction between a monitoring host and other devices, so that no additional traffic is introduced, and therefore the effect on a network traffic monitoring process is negligible. This work utilizes real-time characteristics of the network, and uses a DTR time series to further analyze network anomaly. Under normal operating conditions, real network traffic data is collected from the power test platform in different security domains, so as to verify a proposed ARIMA (p, d, q) model for multiple detection domains. A polymerization period is 1 second, i.e. 1 DTR value is analyzed per second. Firstly, parameters Ts and Nfore are adjusted and optimized to verify the validity of the ARIMA model; the complexity (average delay), fitting effect ($\overline{\text{R-square}}$) and forecast effect ($\overline{\text{RMSE}}$) of the model are as shown in Table 3.

TABLE 3

| $T_s$ | $N_{fore}$ | $T_s/N_{fore}$ | Operation time | Average delay | $\overline{\text{R-square}}$ | $\overline{\text{RMSE}}$ |
| --- | --- | --- | --- | --- | --- | --- |
| 40 | 10 | 4 | 500 s | 0.151 s | 0.89 | 44.49 |
| 40 | 5 | 8 | 450 s | 0.142 s | 0.89 | 39.30 |
| 50 | 10 | 5 | 500 s | 0.171 s | 0.86 | 37.72 |
| 50 | 5 | 10 | 550 s | 0.165 s | 0.84 | 35.99 |
| 60 | 5 | 12 | 650 s | 0.170 s | 0.85 | 31.10 |
| 60 | 10 | 6 | 610 s | 0.190 s | 0.86 | 38.41 |

The ARIMA model operates once within each STW, and continuously operates within a defined time (the operation time in Table 3). Average delay, $\overline{\text{R-square}}$ and $\overline{\text{RMSE}}$ are the average values of delay, R-square and RMSE of the ARIMA model algorithm within each STW. The total number of iterations i (total number of operation STWs) may be obtained by dividing the operation time by a sum of $T_s$ and $N_{fore}$.

Comparison of algorithm effects of different models is as shown in Table 4:

TABLE 4

| Model | $T_s$ | $N_{fore}$ | Operation time | Average delay | $\overline{\text{R-square}}$ | $\overline{\text{RMSE}}$ |
| --- | --- | --- | --- | --- | --- | --- |
| ARIMA | 60 | 5 | 650 s | 0.17 s | 0.85 | 31.10 |
| LSTM | 60 | 5 | 650 s | 0.81 s | 0.94 | 36.55 |
| SARMA | 60 | 5 | 650 s | 0.65 s | 0.87 | 30.07 |
| GARCH | 60 | 5 | 650 s | 0.88 s | 0.93 | 39.38 |
| ARMA | 60 | 5 | 650 s | 0.15 s | 0.64 | 67.55 |
| AR | 60 | 5 | 650 s | 0.08 s | 0.49 | 116.28 |

In conclusion, the ARIMA model achieves a better balance between algorithm complexity (i.e. algorithm delay) and algorithm precision (i.e. goodness of fit R-square and forecast effectiveness RMSE), and other methods all have their own limitations. The parameters are set as $T_s$=60 and $N_{fore}$=5, and an ARIMA-based distributed dynamic threshold value upper limit model is tested by introducing practical network attacks from different security domains. A total of seven types of network attacks (IP scanning, SYN flooding attack, TCP/UDP flooding attack, ARP spoofing attack, Ping-of-death attack, D-DOS attack, replay attack) are considered. A DTR time series is divided into several STWs ($T_s$=60), and it is defined that the system is anomalous when $d_i^{(k)}$} 3, (k=1, 2, . . . ) exists. The following anomaly detection indexes are used for evaluation (one test result is obtained per STW): True Positive (TP for short), True Negative (TN for short), False Positive (FP for short), False Negative (FN for short), True Positive Rate (TPR for short), False Omission Rate (FOR for short), accuracy and average delay; for calculation manners of various indexes, the calculation method of each index may refer to the calculation method of the Receiver Operating Characteristic (ROC for short) curve in machine learning. Table 5 is a distributed detection result of each security domain, in which STWs therein is the total number of operation STWs. The accuracy of the method for recognizing normal and anomalous working conditions may reach above 98.7%, the calculation complexity is low, and the average detection processing time of each STW does not exceed 0.27 s. In addition, the overall FOR of the algorithm detecting TN is low, and is 5.1% (where TN=130 and FN=7).

TABLE 5

| Security domain | STWs | TP | TN | FP | FN | TPR | FOR | Accuracy | Average delay |
| --- | --- | --- | --- | --- | --- | --- | --- | --- | --- |
| DDZ #1 | 855 | 827 | 21 | 5 | 2 | 99.7% | 8.7% | 99.2% | 0.21 s |
| DDZ #2 | 855 | 828 | 22 | 3 | 2 | 99.7% | 8.3% | 99.4% | 0.18 s |
| DDZ #3 | 855 | 836 | 16 | 3 | 0 | 100% | 0% | 99.6% | 0.22 s |
| CDDZ | 855 | 773 | 71 | 8 | 3 | 99.6% | 4.1% | 98.7% | 0.24 s |
| Whole | 3420 | 3264 | 130 | 19 | 7 | 99.7% | 5.1% | 99.2% | 0.21 s |

Figure 7:
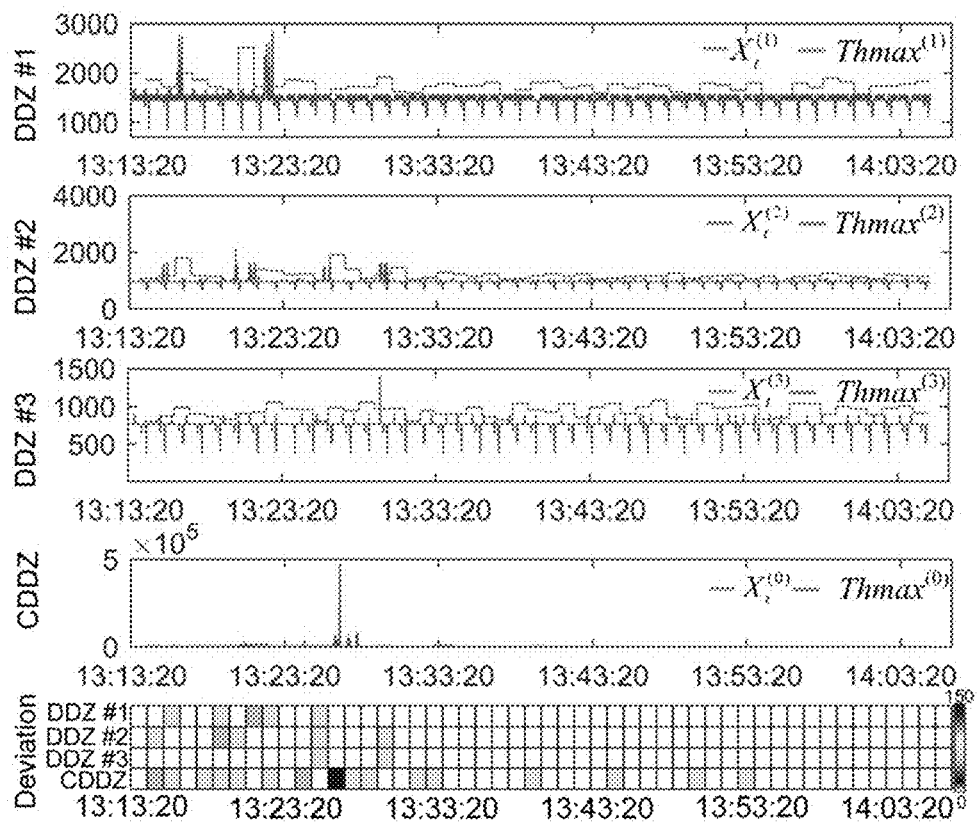
FIG. 7 is a schematic diagram of threshold values and deviation values of traffic distributed detection disclosed in some embodiments of the present disclosure.

In designed experiment #1, a concealed network attack was conducted from 13:14:20 to 13:41:20. Normal operation time of the system was 13:42:20-14:05:20. In the designed experiment #1, the network attack first performed packet sniffing (namely, Ping operation) on DDZ #1 and DDZ #2, and initiated an SYN flooding attack on the corresponding PLCs. Subsequently, TeamViewer version 14.7 (a PC remote control software) is used in the CDDZ to perform remote control on the SCADA workstation, and took over a Human Machine Interface (HMI for short) to control field devices, i.e. circuit breakers located in DDZ #2. FIG. 7 shows traffic measurement values, threshold value limits (red lines) and the magnitude of deviation values within each STW from 13:13:20 to 14:03:20 for each security domain. The detection results of the four security domains (including all DDZs and CDDZ) were all sent in time, and have strong real-time performance and correlation, and may satisfy the security detection of multiple groups of devices in a large-scale industrial network system. Moreover, an anomaly deviation matrix may well track the time when an anomaly occurs, the duration, the position where the anomaly occurs, and the severity of the anomaly. It may be determined from FIG. 7 that packet sniffing and SYN flooding attacks on the DDZ #1 and the DDZ #2 will both make the traffic abruptly increase in a small range, and break through distributed threshold value upper limits. Remote control at the CDDZ may also cause the traffic to abruptly increase by hundreds of times. Regarding these network attacks, large deviation values may be detected by a traffic distribution detection algorithm, so as to perform real-time safety pre-warning and response on the plurality of security domains.

Figure 8:
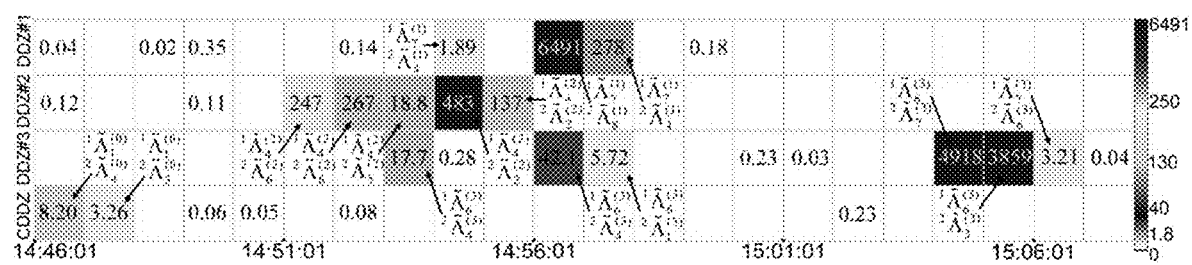
FIG. 8 is a schematic diagram of depiction of an attack path disclosed in some embodiments of the present disclosure.

In consideration of asset vulnerabilities contained in all security domains, a series of new collaborative network attacks (designed experiment #2) are performed in a power test station in a range, including the following steps: (1) IP discovery and packet sniffing attacks were performed on IP segments in a discoverable CDDZ; (2) communication topology information was acquired, and a preliminary attack (Ping-of-death) was used to disturb basic functions of PLCs; (3) Nmap (a network discovery and security audit tool) was used to scan ports opened in the PLCs exposed in an intranet; (4) the open ports were used to initiate an SYN flooding attack and a TCP/UDP flooding attack on the PLCs, to attempt to block communication; (5) relevant exposed vulnerabilities were used to initiate an ARP spoofing attack on all PLCs, and attempted to perform a detection attack on field devices; (6) vulnerability CVE-2019-6857 was used to initiate a D-DOS attack on the Schneider PLC in DDZ #3; and (7) a replay attack was performed by Socket programming, and an industrial operation command (Modbus/TCP) was executed, and unlawfully turning on/off of the circuit breakers in DDZ #3 was taken as a final attack target. As all the high-risk devices may be dynamically captured by the distributed traffic anomaly detection algorithm, the path of the described collaborative attack may be outlined by an anomalous STW (adopting a critical threshold value $\varepsilon=1.8$). As shown in FIG. 8, the high-risk devices obtained by these detection and analysis may correspond to device assets affected by each attack step in the described experiment. Viewing from a longitudinal direction, each column of windowpanes represent an analyzed STW, and a horizontal axis thereof represents a total time period of system analysis; and viewing from a lateral direction, each row of windowpanes represent the condition of one security domain. Viewing from a longitudinal direction, each column of windowpanes represent an analyzed STW, and a horizontal axis thereof represents a total time period of system analysis. FIG. 8 shows the magnitude of data traffic deviation value (if the value is zero, then the relevant windowpane is empty) of a plurality of security domains (including DDZs and CDDZ) within each STW. For example, for DDZ #1, the deviation value is 6491 during 14:56:01 to 14:57:01; and for DDZ #1, the deviation value is 1.89 during 14:54:01 to 14:55:01. High-risk assets corresponding to each anomalous STW (having a deviation value greater than 1.8) are indexed by arrows ($^1\tilde{\Lambda}^1\tilde{\Lambda}$ refers to devices with the highest risk, and $^2\tilde{\Lambda}$ refers to devices with the secondary highest risk). For example, the first STW (i.e. from 14:46:01 to 14:47:01) of the CDDZ has a deviation value of 8.20, and high-risk devices thereof are $^1\tilde{\Lambda}_1^{(0)}$ and $^2\tilde{\Lambda}_4^{(0)}$ (the data traffic proportional change values thereof are 123% and 75%, respectively). The attack paths of the collaborative attack above may be obtained by dynamically traversing all high-risk devices. Specifically, Table 6 shows highest-risk devices (i.e. $^1\tilde{\Lambda}$) within each STW analyzed from 14:51:01 to 14:58:01 (i.e. from 6th STW to 12th STW), and attack paths arranged in a chronological order.

TABLE 6

| STW | 6 | 7 | 8 | 9 | 10 | 11 | 12 |
|---|---|---|---|---|---|---|---|
| Attack path | $\Lambda_4^{(2)}$ | $\Lambda_4^{(2)}$ | $\Lambda_4^{(2)}$ $\Lambda_6^{(3)}$ | $\Lambda_7^{(1)}$ $\Lambda_4^{(2)}$ | $\Lambda_4^{(2)}$ | $\Lambda_7^{(1)}$ $\Lambda_6^{(3)}$ | $\Lambda_7^{(1)}$ $\Lambda_6^{(3)}$ |

In some embodiments of the present disclosure, starting from the perspective of traffic distributed anomaly detection of an industrial network, a traffic anomaly behavior of a specific security domain is detected and analyzed by defining a plurality of security zones and deploying traffic probes with an edge computing capability; detection data is compressed and de-noised, and then a detection result is sent to a control center in real time; and finally, the detection and tracking of network anomalous behaviors in a large-scale complex industrial Internet scenario are completed under the premise of real time and high reliability. The solution may first define prior knowledge of a security domain by quantitative information parameters, and then perform anomalous behavior detection and analysis on large-scale complex industrial network traffic by deploying traffic probes with an edge computing capability; a Autoregressive Integrated Moving Average (ARIMA for short) model is used to perform characterization analysis on traffic anomaly deviation, and finally, an attack link characterization algorithm is used to analyze an intrusion path to acquire a dynamic attack link of an intruder against the industrial Internet.

In the present embodiment, the network topology division operation is performed on the network topology architecture to be detected, so as to obtain the plurality of security domains, and the at least one asset device in each of the plurality of security domains is determined; the regional full traffic in each of the plurality of security domains is acquired, the traffic characteristic time series is determined on the basis of the regional full traffics, and the traffic characteristic time series is analyzed to obtain the new traffic characteristic time series; the traffic anomaly detection model is constructed on the basis of the new traffic characteristic time series, and the distributed anomaly detection is performed on the traffic characteristic time series by the traffic anomaly detection model, so as to obtain the detection result; and the detection result is sent to the information processing center which is preset, so that the information processing center analyzes all the asset devices according to the detection result, so as to obtain the anomalous asset devices and the anomalous information. In some embodiments of the present disclosure, an ARIMA model-based traffic distributed anomaly detection model may perform anomaly detection of a plurality of security zones in industrial Internet with a large scale and complex system, and the large-scale network is divided, thereby significantly reducing data transmission during communication and improving the data redundancy of network data transmission; a distributed network analysis method is used, may improve the security analysis and response capability of the large-scale industrial network, and has high expandability, traceability and detection efficiency. Moreover, some embodiments of the present disclosure are based on a traffic anomaly detection model (ARIMA) and may perform real-time detection on anomalies of the industrial network in a relatively high precision. The algorithm complexity of the ARIMA model is low, and the difficulty of model parameter adaptation is relatively low, and may be adapted to industrial network traffic changes in many scenarios.

Figure 9:
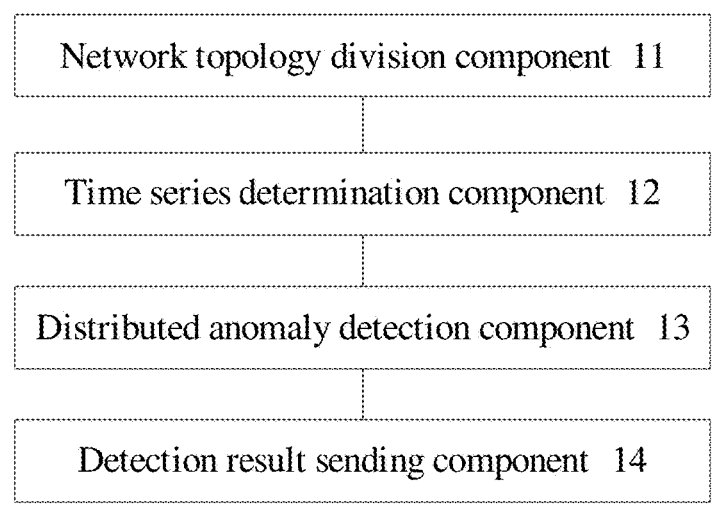
FIG. 9 is a schematic structural diagram of an apparatus for detecting traffic anomaly disclosed in some embodiments of the present disclosure.

Refer to FIG. 9, embodiments of the present disclosure disclose an apparatus for detecting traffic anomaly, which may specifically include:

a network topology division component 11, configured to perform a network topology division operation on a network topology architecture to be detected, so as to obtain a plurality of security domains, and determine at least one asset device in each of the plurality of security domains;

a time series determination component 12, configured to acquire a regional full traffic in each of the plurality of security domains, determine a traffic characteristic time series on the basis of regional full traffics, and analyze the traffic characteristic time series to obtain a new traffic characteristic time series;

a distributed anomaly detection component 13, configured to construct a traffic anomaly detection model on the basis of the new traffic characteristic time series, and perform distributed anomaly detection on the traffic characteristic time series by the traffic anomaly detection model, so as to obtain a detection result; and a detection result sending component 14, configured to send the detection result to an information processing center which is preset, so that the information processing center analyzes all the asset devices according to the detection result, so as to obtain anomalous asset devices and anomalous information.

In the present embodiment, the network topology division operation is performed on the network topology architecture to be detected, so as to obtain the plurality of security domains, and the at least one asset device in each of the plurality of security domains is determined; the regional full traffic in each of the plurality of security domains is acquired, the traffic characteristic time series is determined on the basis of the regional full traffics, and the traffic characteristic time series is analyzed to obtain the new traffic characteristic time series; the traffic anomaly detection model is constructed on the basis of the new traffic characteristic time series, and the distributed anomaly detection is performed on the traffic characteristic time series by the traffic anomaly detection model, so as to obtain the detection result; and the detection result is sent to the information processing center which is preset, so that the information processing center analyzes all the asset devices according to the detection result, so as to obtain the anomalous asset devices and the anomalous information. In some embodiments of the present disclosure, an ARIMA model-based traffic distributed anomaly detection model may perform anomaly detection of a plurality of security zones in industrial Internet with a large scale and complex system, and the large-scale network is divided, thereby significantly reducing data transmission during communication and improving the data redundancy of network data transmission; a distributed network analysis method is used, may improve the security analysis and response capability of the large-scale industrial network, and has high expandability, traceability and detection efficiency. Moreover, some embodiments of the present disclosure are based on a traffic anomaly detection model (ARIMA) and may perform real-time detection on anomalies of the industrial network in a relatively high precision. The algorithm complexity of the ARIMA model is low, and the difficulty of model parameter adaptation is relatively low, and may be adapted to industrial network traffic changes in many scenarios.

In some specific embodiments, the time series determination component 12 may specifically include:
a connection relationship establishment component, configured to add a traffic probe system to each of the plurality of security domains respectively, and establish a connection relationship between a local switch mirror port and each of traffic probe systems; and
a regional full traffic acquisition component, configured to respectively acquire the regional full traffic in each of the plurality of security domains by the connection relationship.

In some specific embodiments, the time series determination component 12 may specifically include:
a traffic characteristic time series determination component, configured to acquire all the regional full traffics, and determine the traffic characteristic time series on the basis of the regional full traffics; and
an analysis component, configured to analyze the traffic characteristic time series by a sliding window algorithm, so as to obtain the new traffic characteristic time series.

In some specific embodiments, the distributed anomaly detection component 13 may specifically include:
a deviation amount characterization component, configured to perform a deviation amount characterization operation on the traffic characteristic time series by the traffic anomaly detection model, so as to obtain the detection result containing a deviation situation.

In some specific embodiments, the detection result sending component 14 may specifically include:
a connection relationship establishment component, configured to establish a connection relationship between local and the information processing center which is preset; and
a detection result sending component, configured to send the detection result to the information processing center by the connection relationship, so that the information processing center analyzes all the asset devices according to the deviation situation in the detection result, so as to obtain the anomalous asset devices and the anomalous information.

In some specific embodiments, the detection result sending component 14 may specifically include:
an asset device screening component, configured to send the detection result to the information processing center which is preset, so that the information processing center screens out the anomalous asset devices from all the asset devices according to the deviation situation, determines risk degrees of the anomalous asset devices, and determines at least one highest-risk asset device and at least one secondary-highest-risk asset device from the anomalous asset devices according to the risk degrees; and generates the anomalous information on the basis of the at least one highest-risk asset device, the at least one secondary-highest-risk asset device and the deviation situation.

In some specific embodiments, the detection result sending component 14 may specifically include:
an intrusion path analysis component, configured to perform intrusion path analysis by an attack link characterization algorithm and on the basis of the anomalous asset devices and the anomalous information, so as to obtain a network attack link; and
a safety pre-warning and response component, configured to detect the detection result by a traffic distributed detection algorithm, so to obtain an anomaly detection result, determine corresponding security domains according to the anomaly detection result and the network attack link, and perform safety pre-warning and response on the corresponding security domains.

Figure 10:
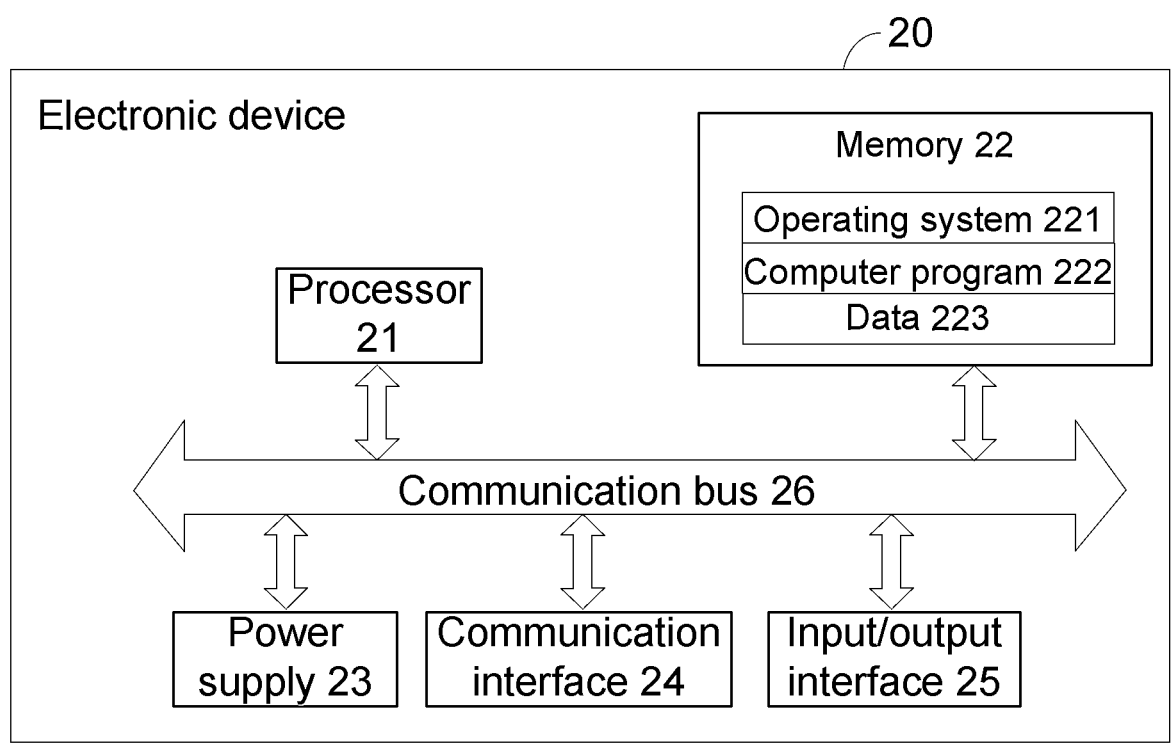
FIG. 10 is a structural diagram of an electronic device provided in some embodiments of the present disclosure.

FIG. 10 is a schematic structural diagram of an electronic device provided according to embodiments of the present disclosure. The electronic device 20 may specifically include: at least one processor 21, at least one memory 22, a power supply 23, a communication interface 24, an input/output interface 25 and a communication bus 26. The memory 22 is used to store a computer program, and the computer program is loaded and executed by the processor 21, so as to implement relevant steps in the method for detecting traffic anomaly executed by the electronic device disclosed any one of the embodiments above.

In the present embodiment, the power supply 23 is used to provide a working voltage for each hardware device on the electronic device 20; and the communication interface 24 may establish a data transmission channel with an external device for the electronic device 20, and a communication protocol followed thereby is any communication protocol that may be applied to the technical solutions in some embodiments of the present disclosure, which will not be specifically limited herein; and the input/output interface 25 is used to acquire external input data or output data to the outside, and the specific interface type thereof may be selected according to specific application requirements, which will not be specifically limited herein.

In addition, the memory 22, as a carrier for resource storage, may be a read-only memory, a random access memory, a magnetic disk or an optical disk, etc.; and resources stored thereon include an operating system 221, a computer program 222, data 223, and the like, and the storage manner may be temporary storage or permanent storage.

The operating system 221 is used to manage and control each hardware device on the electronic device 20 and the computer program 222, so as to implement operation and processing of the data 223 in the memory 22 by the processor 21. The operating system may be Windows, Unix, Linux, and the like. In addition to the computer program that may be used for implementing the method for detecting traffic anomaly executed by the electronic device 20 disclosed in any one of the embodiments above, the computer program 222 may further include a computer program that may be used for performing other specific operations. In addition to data received by a traffic anomaly detection device and transmitted from an external device, the data 223 may also include data collected by the input/output interface 25 of the electronic device itself.

The steps of the method or algorithm described in conjunction with the embodiments disclosed herein may also be directly implemented by hardware, by a software component executed by a processor, or by a combination thereof. The software component may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

Further, the embodiments of the present disclosure further provide a non-transitory computer-readable storage medium in which a computer program is stored, and when the computer program is loaded and executed by the processor, the steps in the method for detecting traffic anomaly disclosed any one of the embodiments above are implemented.

Finally, it should be noted that in the present text, relational terms such as first and second, etc. are only used to distinguish one entity or operation from another entity or operation, and do not necessarily require or imply any actual relationship or sequence between these entities or operations. Furthermore, the terms "include", "including", or any other variations thereof are intended to cover a non-exclusive inclusion, so that a process, a method, an article, or a device that includes a series of elements not only includes those elements, but also includes other elements that are not explicitly listed, or further includes inherent elements of the process, the method, the article, or the device. Without further limitation, an element defined by a sentence "including a . . . " does not exclude other same elements existing in a process, a method, an article, or a device that includes the element.

Hereinabove, a method and apparatus for detecting traffic anomaly, a device and a storage medium provided in some embodiments of the present disclosure are introduced in detail. The principle and embodiments of the present disclosure are described herein through specific examples, and the illustration of the embodiments above is only used to help understand the method and core ideas of some embodiments of the present disclosure; moreover, a person of ordinary skill in the art may make modifications to the specific embodiments and application ranges thereof according to the idea of the present disclosure. In conclusion, the content of the description shall not be construed as limitation to the present disclosure.

What is claimed is:

1. A method for detecting traffic anomaly, comprising:
   performing a network topology division operation on a network topology architecture to be detected, so as to obtain a plurality of security domains, and determining at least one asset device in each of the plurality of security domains;
   acquiring a regional full traffic in each of the plurality of security domains, determining a traffic characteristic time series on the basis of regional full traffics, and analyzing the traffic characteristic time series to obtain a new traffic characteristic time series;
   constructing a traffic anomaly detection model on the basis of the new traffic characteristic time series, and performing distributed anomaly detection on the traffic characteristic time series by the traffic anomaly detection model, so as to obtain a detection result; and
   sending the detection result to an information processing center which is preset, so that the information processing center analyzes all asset devices according to the detection result, so as to obtain anomalous asset devices and anomalous information,
   wherein determining the traffic characteristic time series on the basis of the regional full traffics, and analyzing the traffic characteristic time series to obtain the new traffic characteristic time series, comprises:
   acquiring all the regional full traffics, and determining the traffic characteristic time series on the basis of the regional full traffics; and
   analyzing the traffic characteristic time series by a sliding window algorithm, so as to obtain the new traffic characteristic time series.

2. The method for detecting the traffic anomaly as claimed in claim 1, wherein acquiring the regional full traffic in each of the plurality of security domains, comprises:
   adding a traffic probe system to each of the plurality of security domains respectively, and establishing a connection relationship between a local switch mirror port and each of traffic probe systems; and
   acquiring the regional full traffic in each of the plurality of security domains respectively by the connection relationship.

3. The method for detecting traffic anomaly as claimed in claim 2, wherein after obtaining the anomalous asset devices and the anomalous information, the method further comprises:
   performing intrusion path analysis by an attack link characterization algorithm and on the basis of the anomalous asset devices and the anomalous information, so as to obtain a network attack link; and
   detecting the detection result by a traffic distributed detection algorithm to obtain an anomaly detection result, determining corresponding security domains according to the anomaly detection result and the network attack link, and performing safety pre-warning and response on the corresponding security domains.

4. The method for detecting traffic anomaly as claimed in claim 1, wherein performing the distributed anomaly detection on the traffic characteristic time series by the traffic anomaly detection model, so as to obtain the detection result, comprises:
   performing a deviation amount characterization operation on the traffic characteristic time series by the traffic anomaly detection model, so as to obtain the detection result containing a deviation situation.

5. The method for detecting traffic anomaly as claimed in claim 4, wherein sending the detection result to the information processing center which is preset, so that the information processing center analyzes all the asset devices according to the detection result, so as to obtain the anomalous asset devices and the anomalous information, comprises:
establishing a connection relationship between local and the information processing center which is preset; and
sending the detection result to the information processing center by the connection relationship, so that the information processing center analyzes all the asset devices according to the deviation situation in the detection result, so as to obtain the anomalous asset devices and the anomalous information.

6. The method for detecting traffic anomaly as claimed in claim 4, wherein after obtaining the anomalous asset devices and the anomalous information, the method further comprises:
performing intrusion path analysis by an attack link characterization algorithm and on the basis of the anomalous asset devices and the anomalous information, so as to obtain a network attack link; and
detecting the detection result by a traffic distributed detection algorithm to obtain an anomaly detection result, determining corresponding security domains according to the anomaly detection result and the network attack link, and performing safety pre-warning and response on the corresponding security domains.

7. The method for detecting traffic anomaly as claimed in claim 5, wherein sending the detection result to the information processing center which is preset, so that the information processing center analyzes all the asset devices according to the deviation situation in the detection result, so as to obtain the anomalous asset devices and the anomalous information, comprises:
sending the detection result to the information processing center which is preset, so that the information processing center screens out the anomalous asset devices from all the asset devices according to the deviation situation, determines risk degrees of the anomalous asset devices, and determines at least one highest-risk asset device and at least one secondary-highest-risk asset device from the anomalous asset devices according to the risk degrees; and generates the anomalous information on the basis of the at least one highest-risk asset device, the at least one secondary-highest-risk asset device and the deviation situation.

8. The method for detecting traffic anomaly as claimed in claim 5, wherein after obtaining the anomalous asset devices and the anomalous information, the method further comprises:
performing intrusion path analysis by an attack link characterization algorithm and on the basis of the anomalous asset devices and the anomalous information, so as to obtain a network attack link; and
detecting the detection result by a traffic distributed detection algorithm to obtain an anomaly detection result, determining corresponding security domains according to the anomaly detection result and the network attack link, and performing safety pre-warning and response on the corresponding security domains.

9. The method for detecting traffic anomaly as claimed in claim 7, wherein after obtaining the anomalous asset devices and the anomalous information, the method further comprises:
performing intrusion path analysis by an attack link characterization algorithm and on the basis of the anomalous asset devices and the anomalous information, so as to obtain a network attack link; and
detecting the detection result by a traffic distributed detection algorithm to obtain an anomaly detection result, determining corresponding security domains according to the anomaly detection result and the network attack link, and performing safety pre-warning and response on the corresponding security domains.

10. The method for detecting traffic anomaly as claimed in claim 1, wherein after obtaining the anomalous asset devices and the anomalous information, the method further comprises:
performing intrusion path analysis by an attack link characterization algorithm and on the basis of the anomalous asset devices and the anomalous information, so as to obtain a network attack link; and
detecting the detection result by a traffic distributed detection algorithm to obtain an anomaly detection result, determining corresponding security domains according to the anomaly detection result and the network attack link, and performing safety pre-warning and response on the corresponding security domains.

11. The method for detecting traffic anomaly as claimed in claim 1, wherein after obtaining the anomalous asset devices and the anomalous information, the method further comprises:
performing intrusion path analysis by an attack link characterization algorithm and on the basis of the anomalous asset devices and the anomalous information, so as to obtain a network attack link; and
detecting the detection result by a traffic distributed detection algorithm to obtain an anomaly detection result, determining corresponding security domains according to the anomaly detection result and the network attack link, and performing safety pre-warning and response on the corresponding security domains.

12. An electronic device, comprising:
a memory for storing a computer program;
and a processor for executing the computer program, wherein the computer program, when being executed by the processor, cause the processor to:
perform a network topology division operation on a network topology architecture to be detected, so as to obtain a plurality of security domains, and determine at least one asset device in each of the plurality of security domains;
acquire a regional full traffic in each of the plurality of security domains, determine a traffic characteristic time series on the basis of regional full traffics, and analyze the traffic characteristic time series to obtain a new traffic characteristic time series;
construct a traffic anomaly detection model on the basis of the new traffic characteristic time series, and perform distributed anomaly detection on the traffic characteristic time series by the traffic anomaly detection model, so as to obtain a detection result; and
send the detection result to an information processing center which is preset, so that the information processing center analyzes all asset devices according to the detection result, so as to obtain anomalous asset devices and anomalous information, wherein the computer program, when being executed by the processor, cause the processor further to:

acquire all the regional full traffics, and determine the traffic characteristic time series on the basis of the regional full traffics; and analyze the traffic characteristic time series by a sliding window algorithm, so as to obtain the new traffic characteristic time series.

13. The electronic device as claimed in claim 12, wherein the computer program, when being executed by the processor, cause the processor further to:

add a traffic probe system to each of the plurality of security domains respectively, and establish a connection relationship between a local switch mirror port and each of traffic probe systems; and acquire the regional full traffic in each of the plurality of security domains respectively by the connection relationship.

14. The electronic device as claimed in claim 12, wherein the computer program, when being executed by the processor, cause the processor further to:

perform a deviation amount characterization operation on the traffic characteristic time series by the traffic anomaly detection model, so as to obtain the detection result containing a deviation situation.

15. The electronic device as claimed in claim 14, wherein the computer program, when being executed by the processor, cause the processor further to:

establish a connection relationship between local and the information processing center which is preset; and send the detection result to the information processing center by the connection relationship, so that the information processing center analyzes all the asset devices according to the deviation situation in the detection result, so as to obtain the anomalous asset devices and the anomalous information.

16. The electronic device as claimed in claim 15, wherein the computer program, when being executed by the processor, cause the processor further to:

send the detection result to the information processing center which is preset, so that the information processing center screens out the anomalous asset devices from all the asset devices according to the deviation situation, determines risk degrees of the anomalous asset devices, and determines at least one highest-risk asset device and at least one secondary-highest-risk asset device from the anomalous asset devices according to the risk degrees; and generates the anomalous information on the basis of the at least one highest-risk asset device, the at least one secondary-highest-risk asset device and the deviation situation.

17. The electronic device as claimed in claim 12, wherein the computer program, when being executed by the processor, cause the processor further to:

perform intrusion path analysis by an attack link characterization algorithm and on the basis of the anomalous asset devices and the anomalous information, so as to obtain a network attack link; and detect the detection result by a traffic distributed detection algorithm to obtain an anomaly detection result, determine corresponding security domains according to the anomaly detection result and the network attack link, and perform safety pre-warning and response on the corresponding security domains.

18. A non-transitory computer-readable storage medium, for storing a computer program; wherein when executed by a processor, the computer program causes the processor to perform a network topology division operation on a network topology architecture to be detected, so as to obtain a plurality of security domains, and determine at least one asset device in each of the plurality of security domains;

acquire a regional full traffic in each of the plurality of security domains, determine a traffic characteristic time series on the basis of regional full traffics, and analyze the traffic characteristic time series to obtain a new traffic characteristic time series;

construct a traffic anomaly detection model on the basis of the new traffic characteristic time series, and perform distributed anomaly detection on the traffic characteristic time series by the traffic anomaly detection model, so as to obtain a detection result; and send the detection result to an information processing center which is preset, so that the information processing center analyzes all asset devices according to the detection result, so as to obtain anomalous asset devices and anomalous information, wherein determining the traffic characteristic time series on the basis of the regional full traffics, and analyzing the traffic characteristic time series to obtain the new traffic characteristic time series, comprises:

acquiring all the regional full traffics, and determining the traffic characteristic time series on the basis of the regional full traffics; and analyzing the traffic characteristic time series by a sliding window algorithm, so as to obtain the new traffic characteristic time series.

* * * * *